United States Patent [19]

Mochizuki et al.

[11] Patent Number: 4,899,043
[45] Date of Patent: Feb. 6, 1990

[54] FAULT MONITORING SYSTEM FOR OPTICAL FIBER COMMUNICATION SYSTEMS

[75] Inventors: Kiyofumi Mochizuki, Hachioji; Noboru Edagawa, Tokyo; Yoshinao Iwamoto, Wakayama, all of Japan

[73] Assignee: Kokusai Denshin Denwa Kabushiki Kaisha, Tokyo, Japan

[21] Appl. No.: 219,601

[22] Filed: Jul. 15, 1988

[30] Foreign Application Priority Data

Jul. 23, 1987 [JP] Japan ................................ 62-182243

[51] Int. Cl.⁴ .............................................. H01J 5/16
[52] U.S. Cl. ...................................... 250/227; 356/73.1
[58] Field of Search .............................. 250/227, 216; 350/96.15, 96.16; 356/73.1

[56] References Cited
U.S. PATENT DOCUMENTS 4,708,471 11/1987 Beckman et al. .................. 356/73.1

Primary Examiner—David C. Nelms
Attorney, Agent, or Firm—Emmanuel J. Lobato; Robert E. Burns

[57] ABSTRACT

A fault monitoring system for optical fiber communication system having a bidirectional optical amplifier between first and second optical fiber transmission lines. An optical monitoring signal of a first frequency different from frequencies of communication signal light of the optical fiber communication system is applied to the first input/output port of the bidirectional optical amplifier through the first optical fiber transmission line and then branched through a first optical filter passing therethrough of the first frequency to apply the branched optical monitoring signal of the first frequency to the second input/output port of the bidirectional amplifier. Another optical monitoring signal of a second frequency different from the first frequency and frequencies of the communication signal light is applied to the second input/output port of the bidirectional optical amplifier through the second optical transmission line and then branched through a second optical filter passing therethrough of the second frequency to apply the branched optical monitoring signal of the second frequency to the first input/output port of the bidirectional amplifier. A fault of the bidirectional amplifier can be detected by monitoring the optical monitoring signals of the first frequency and of the second frequency at respective ends of the first optical fiber transmission line and the second optical fiber transmission line.

2 Claims, 2 Drawing Sheets

FAULT MONITORING SYSTEM FOR OPTICAL FIBER COMMUNICATION SYSTEMS

BACKGROUND OF THE INVENTION

The present invention relates to a fault localization system for use in optical fiber communication systems.

Optical fiber communication systems now in use utilize, as a repeating method, an optical-to-electric-to-optical conversion which involves converting an optical signal into an electric signal, amplifying and waveform-shaping the electric signal, and driving again a semiconductor laser with the amplified electric signal.

On the other hand, there has been proposed, as a new repeating system, an optical amplification method which directly amplifies an optical signal. The repeating system utilizing the optical amplification is advantageous over the conventional optical-to-electric-to optical conversion repeating system in that the repeating circuits used are simplified and that a wavelength-multiplex signal and a frequency-multiplex signal at a given transmission rate can be amplified collectively by one optical amplifier. Furthermore, since the amplifier gain is fixed regardless of the direction of incidence of light, optical signals in two ways can be amplified together by one optical amplifier.

The optical amplification is performed mainly by a method using a semiconductor laser and an optical fiber Raman amplification method utilizing stimulated Raman scattering which occurs in an optical fiber. Up to now results of many studies have been reported on amplification characteristics and noise characteristics of these optical amplification methods.

Concerning the direct optical amplification system it is now predicted theoretically that a maximum amplifier gain of 30 to 40 db is obtainable and that a signal can be transmitted, in the form of light, over 10,000 km without being affected by a background light noise caused by spontaneous scattered light, and hence the practicality of this as system as a future optical repeating system is becoming higher (IEEE. J. Lightwave Tech., Vol. LT-4, pp. 1328-1333 and IEEE. J. Quantum Electron, Vol. QE-17, pp. 919-935). When this optical repeating system is put into practical use, an optical cable having a repeater will be considered as a mere optical transmission line just like a non-repeating optical cable, and the combination of this system and an optical branching technique will make possible a multipoint communication in which a frequency (or wavelength) is allocated to each section between respctive points.

However, no proper fault monitor system has been proposed for use in such an optical fiber transmission system employing an optical amplifier.

SUMMARY OF THE INVENTION

An object of the present invention is to provide a fault monitor system for optical fiber communication systems which permits accurate monitoring of a fault in a bidirectional optical fiber communication system provided with an optical amplifier.

In the fault monitor system of the present invention for an optical fiber communication system which has a bidirectional amplifier disposed between first and second optical fiber transmission lines, first and second optical branches are disposed in a fist input/output port of the bidirectional amplifier at the side of the first optical fiber transmission lines and in a second input/output port of the bidirectional amplifier at the side of the second optical fiber transmission line, respectively, a first optical filter which permits the passage therethrough of an optical monitor signal of a first frequency is provided in a first optical branch path which is branched from the first optical branch, coupled to the second optical branch and then connected to the second input/output port of the bidirectional amplifier, and a second optical filter which permits the passage therethrough of an optical monitor signal of a second frequency which is not permitted to pass through the first optical filter is provided in a second optical branch path which is branched from the second optical branch, coupled to the first optical branch and then connected to the first input/output port of the bidirectional amplifier. A fault is monitored by monitoring the monitor signals of the first and second frequencies which are sent back to the first and second optical fiber transmission lines, respectively.

BRIEF DESCRIPTION OF THE DRAWINGS

The present invention will be described in detail below with reference to the accompanying drawings, in which.

DETAILED DESCRIPTON

Figure 1:
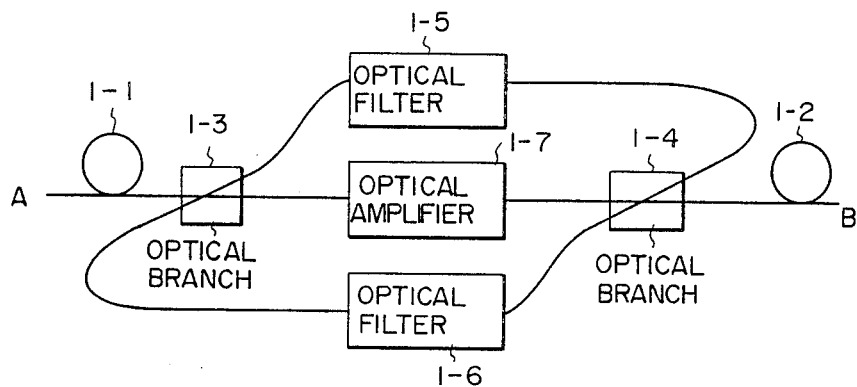
FIG. 1 is a block diagram illustrating an embodiment of the present invention.

FIG. 1 illustrates an embodiment of the present invention. To monitor the situation of an optical amplifier 1-7, an optical signal of a frequency $f_1$ is sent from the side A. This optical signal is branched by an optical branch (or optical coupler) 1-3 such as an optical fiber coupler into two, one of which passes through an optical filter 1-5 which permits the passage therethrough of an optical signal of the frequency $f_1$ alone and is coupled by an optical branch (or optical coupler) 1-4 to a main-line optical fiber 1-2, thereafter being set back to the side A via the optical amplifier 1-7. On the other hand, an optical signal of a frequency $f_2$ is sent from the side B. This optical signal is branched by the optical branch 1-4 into two, one of which passes through an optical filter 1-6 which permits the passage therethrough of an optical signal of the frequency $f_2$ alone and is coupled by the optical branch 1-3 to a main-line optical fiber 1-1, thereafter being sent back to the side B via the optical amplifier 1-7. By setting the frequencies $f_1$ and $f_2$ of the optical signals for monitor use to frequencies different from that of an optical signal for communication, it is also possible to monitor the occurrence of a fault in the optical amplifier 1-7 and the optical cable without exerting any influence on the optical signal for communication. As described above, the present invention permit the detection of a fault in the optical amplifier and the optical cable in the bidirection optical fiber communication system which employs an optical amplifier.

Even if the frequencies $f_1$ and $f_2$ are the same, the above-described function can be obtained. In an optical fiber communication system having a plurality of optical amplification repeaters, it is also possible, with the present invention, to detect which of the repeaters is faulty and which repeater section is faulty, by allocating a monitoring optical signal of a different frequency for each repeater.

Figure 2:
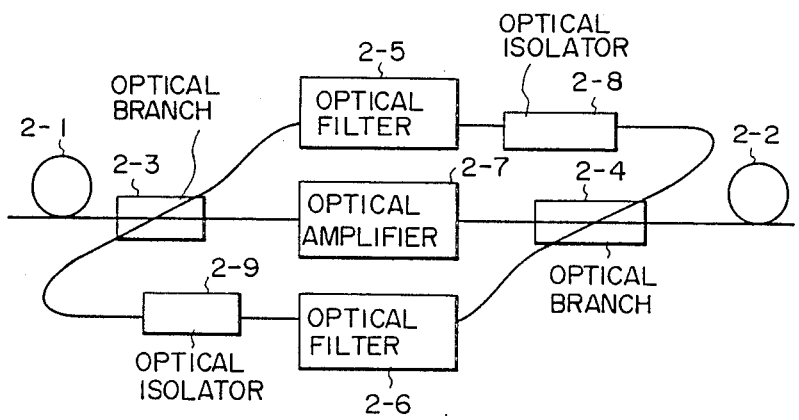
FIG. 2 is a block diagram illustrating another embodiment of the present invention.

FIG. 2 illustrates another embodiment of the present invention. The embodiment of FIG. 2 is identical with the embodiment of FIG. 1 except the additional provision of optical isolators 2-8 and 2-9. In the embodiment of FIG. 1 there exist, as monitoring optical signals which pass through the optical filters 1-5 and 1-6, two optical signals one of which is branched by the optical branch 1-3 and coupled by the optical branch 1-4 to the main-line optical fiber 1-2 and the other of which is branched by the optical branch 1-4 and couples by the optical branch 1-3 to the main-line optical fiber 1-1. The influence of the two signals on the fault finding operation could be avoided by using the optical isolators 2-8 and 2-9 as shown in FIG. 2.

Figure 3:
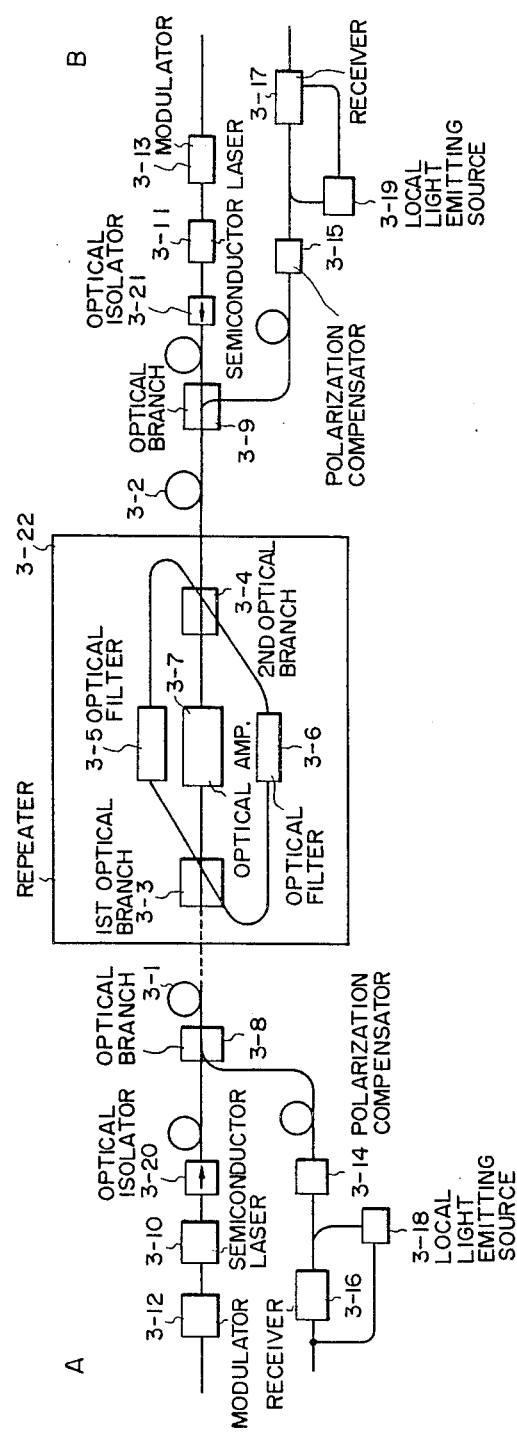
FIG. 3 is a block diagram illustrating a further embodiment of the present invention.

FIG. 3 illustrates an example of an optical transmission system embodying the present invention. In the case of checking for the function of an n-th repeater 3-22, an optical frequency $f_n$ allocated to the repeater 3-22 is transmitted from the point A. The optical frequency $f_n$ can be generated by, for example, modulating a semiconductor laser 3-10 with a modulator 3-12. This signal is transmitted via optical isolators 3-20 and an optical branch 3-8 to an optical fiber 3-1, from which it is branched by an optical branch 3-3, and the branched output passes through an optical filter 3-5 which permits the passage therethrough of light of the frequency $f_n$ and then coupled by the optical branch 3-4 to the main line system, thereafter being amplified by an optical amplifier 3-7 and fed back to the point A. At the point A the signal thus fed back thereto is branched by the optical branch 3-8 to a receiving system. In the receiving system the monitoring signal light is adjusted by a polarization compensator 3-14 so that its polarization enters into agreement with the polarization of a local light emitting source 3-18 tuned to the optical frequency $f_n$ of the monitoring signal, and the signal is demodulated by a receiver 3-16. The monitoring of the repeating system 3-22 from the point B can also be achieved in a similar manner by using an optical fiber 3-2, an optical branch 3-9, an optical isolator 3-21, a semiconductor laser 3-11, a modulator 3-13, a polarization compensator 3-15, a local light emitting source 3-9 and a receiver 3-17.

For the bidirectional optical amplifiers 1-7, 2-7 and 3-7 for use in the present invention, it is possible to employ the "Optical Amplification System" on which an application was filed by the present inventor under the same date as this application. (Japan Pat. Appln. No. 182244/87).

As described above in detail, according to the present invention, a fault in a bidirection optical transmission system using a bidirectional optical amplifier can accurately be localized by monitoring individual monitoring signals. Further, the present invention is also applicable to a single optical transmission system using a plurality of bidirectional optical amplifiers, and hence is of great utility in practical use.

What we claim is:

1. A fault monitoring system for an optical fiber transmission system having a bidirectional optical amplifier between first and second optical fiber transmission lines:

wherein first and second optical branches are provided in first and second input/output ports of the bidirectional optical amplifier at the sides of the first and second optical fiber transmission lines, respctively; a first optical filter which permits the passage therethrough of an optical monitoring signal of a first frequency transmitted from a first station is provided in a first optical branch path which is branched by the first optical branch, coupled to the second optical branch and connected to the second input/output port of the bidirectional optical amplifier; a second optical filter which permits the passage therethrough of a optical monitoring signal of a second frequency which is transmitted from a second station and not permitted to pass through the first optical filter is provided in a second optical branch path which is branched by the second optical branch, coupled to the first optical branch and connected to the input/output port of the bidirectional optical amplifier; and monitor means provided at each of the first station and the second station to monitor for the location of a fault monitor signals of the first and second frequencies which are sent back to the first and second optical fiber transmission lines, respectively.

2. A fault monitoring system according to claim 1, in which the first optical branch path and the second optical branch path further have therein a first optical isolator and a second optical isolator, respectively to eliminate influence on the optical monitoring signals by branched optical signals in said first and second optical paths coupled to the transmission lines.

* * * * *